United States Patent [19]

Alves

[11] Patent Number: 4,459,044

[45] Date of Patent: Jul. 10, 1984

[54] OPTICAL SYSTEM FOR AN INSTRUMENT TO DETECT THE TEMPERATURE OF AN OPTICAL FIBER PHOSPHOR PROBE

[75] Inventor: Ronald V. Alves, Palo Alto, Calif.

[73] Assignee: Luxtron Corporation, Mountain View, Calif.

[21] Appl. No.: 232,626

[22] Filed: Feb. 9, 1981

[51] Int. Cl.³ .............................. G01J 5/02; G01J 5/54
[52] U.S. Cl. ................................. 374/131; 350/96.28; 356/44; 374/159; 374/208
[58] Field of Search .................. 73/355 R; 250/461.1, 250/252.1; 350/96.28, 96.29; 356/44; 374/162, 159, 137, 130, 1, 2, 3; 313/271

[56] References Cited

U.S. PATENT DOCUMENTS

| | | | |
|---|---|---|---|
| 2,546,160 | 3/1951 | Lengyel | 250/461 X |
| 2,551,650 | 5/1951 | Urbach | 73/355 R |
| 2,656,479 | 10/1953 | Brown | 313/271 X |
| 2,718,597 | 9/1955 | Heigl et al. | 250/252.1 |
| 3,139,752 | 7/1964 | Giedt | 73/341 X |
| 3,256,518 | 6/1966 | Crane | 73/356 X |
| 3,286,524 | 11/1966 | Malone | 73/355 R X |
| 3,617,745 | 11/1971 | Reed | 374/132 X |
| 3,798,366 | 3/1974 | Hunt et al. | 178/6.8 |
| 3,941,487 | 3/1976 | Ehret et al. | 356/244 X |
| 4,016,761 | 4/1977 | Rozzell et al. | 73/356 |
| 4,030,362 | 6/1977 | Dimeff | 374/129 |
| 4,075,493 | 2/1978 | Wickersheim | 250/461 R |
| 4,145,142 | 3/1979 | Mikeman | 250/252.1 X |
| 4,170,731 | 10/1979 | Howell et al. | 250/227 |
| 4,215,275 | 7/1980 | Wickersheim | 250/459 |
| 4,223,217 | 9/1980 | Bongard et al. | 250/227 |
| 4,223,226 | 9/1980 | Quck et al. | 73/355 R X |
| 4,245,507 | 1/1981 | Samulski | 374/159 |
| 4,278,349 | 7/1981 | Sander | 356/44 |
| 4,313,344 | 2/1982 | Brogardh et al. | 374/129 X |
| 4,334,774 | 6/1982 | Glass et al. | 250/338 X |
| 4,349,886 | 9/1982 | Ibar | 364/571 X |

OTHER PUBLICATIONS

"Recent Advances in Optical Temperature Measurement", by Wickersheim et al., (Luxtron Corp.), 8 pages, 12/1979.
Publ. "Model 1000A Fluoroptic ™ Thermometer", Luxtron Corporation, 7/1980 Bulletin, (1 sheet).
"Ratioing Fluoroptic Temp. Sensor for Induced Hyperthermia", by Wickersheim et al., 6 pages 6/1980.
Publ. "Automatic Self Certification of a Computer-Controlled Calibration System", by Seeley et al., IREE Transactions of Inst., vol. 1M-19, No. 4, 11/1970, pp. 245-252.

Primary Examiner—Daniel M. Yasich
Attorney, Agent, or Firm—Majestic, Gallagher, Parsons & Siebert

[57] ABSTRACT

An optical system for exciting a temperature dependent phosphor with radiation and detecting independently emissions therefrom in optically isolable first and second wavelength ranges that gives an indication of the temperature of the phosphor. The optical system is carried by a heat-insulating housing disposed between a heat generating light source and the heat sensitive detectors. Dichroic mirrors are utilized to separate the two wavelength ranges emitted by the phosphor and to allow the sharing of a common optical path by three different radiation wavelength ranges without an undue loss of radiation intensity in any of the wavelength ranges. The light source may be of a helically shaped filament that is tilted with respect to an imaging optical axis so that the side of the helix is imaged with a minimum amount of the space between the turns showing, thereby maximizing the optical energy imaged from the light source. A temperature sensitive phosphor sensor is utilized with the instrument for internal calibration. The internal reference phosphor sensor also has its temperature measured by another standard technique for comparison. The internal calibration can also be used to calibrate a phosphor sensor on the end of a optical fiber by placing that end in a calibration bath maintained within the instrument.

10 Claims, 5 Drawing Figures

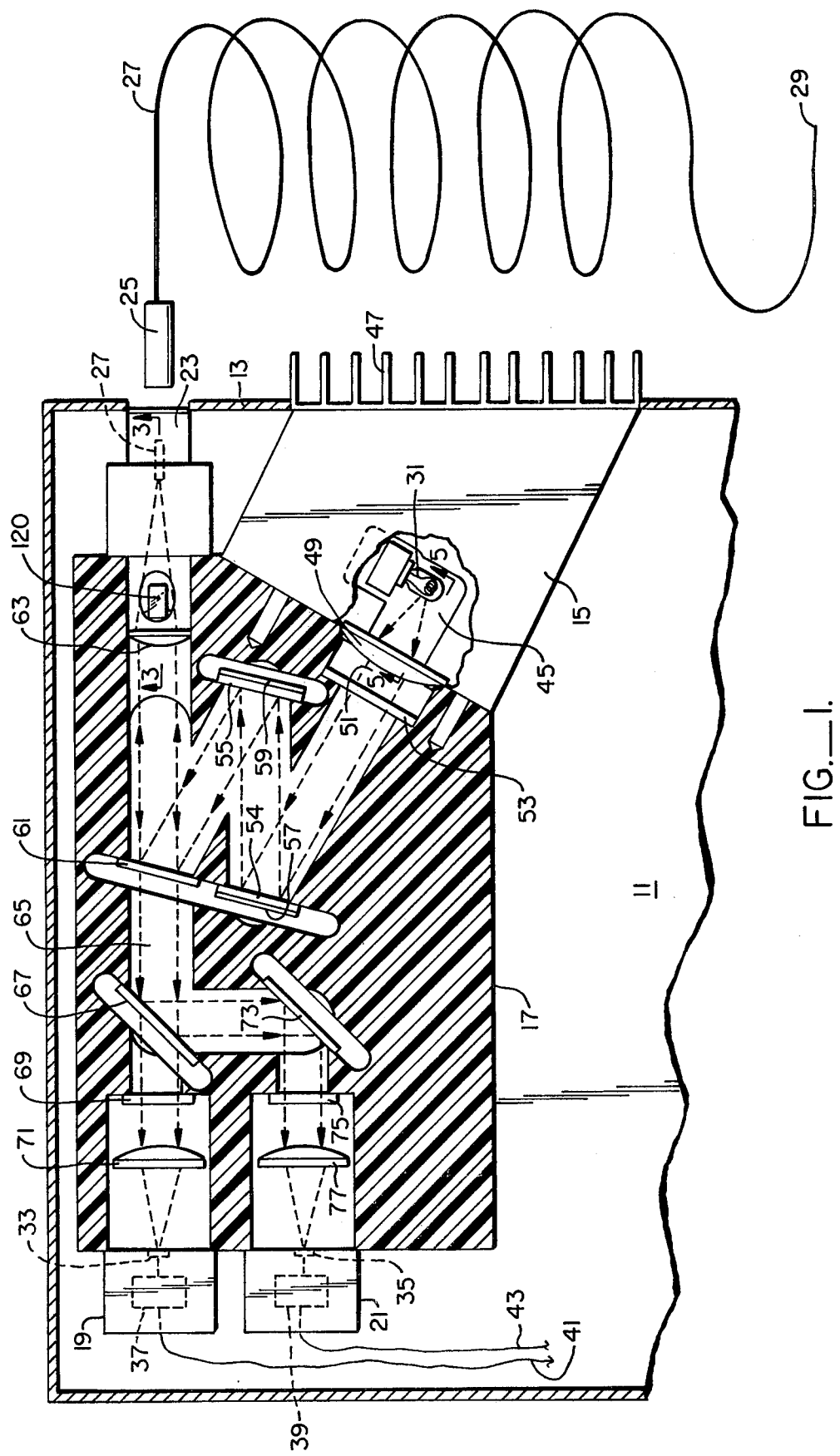
FIG._1.

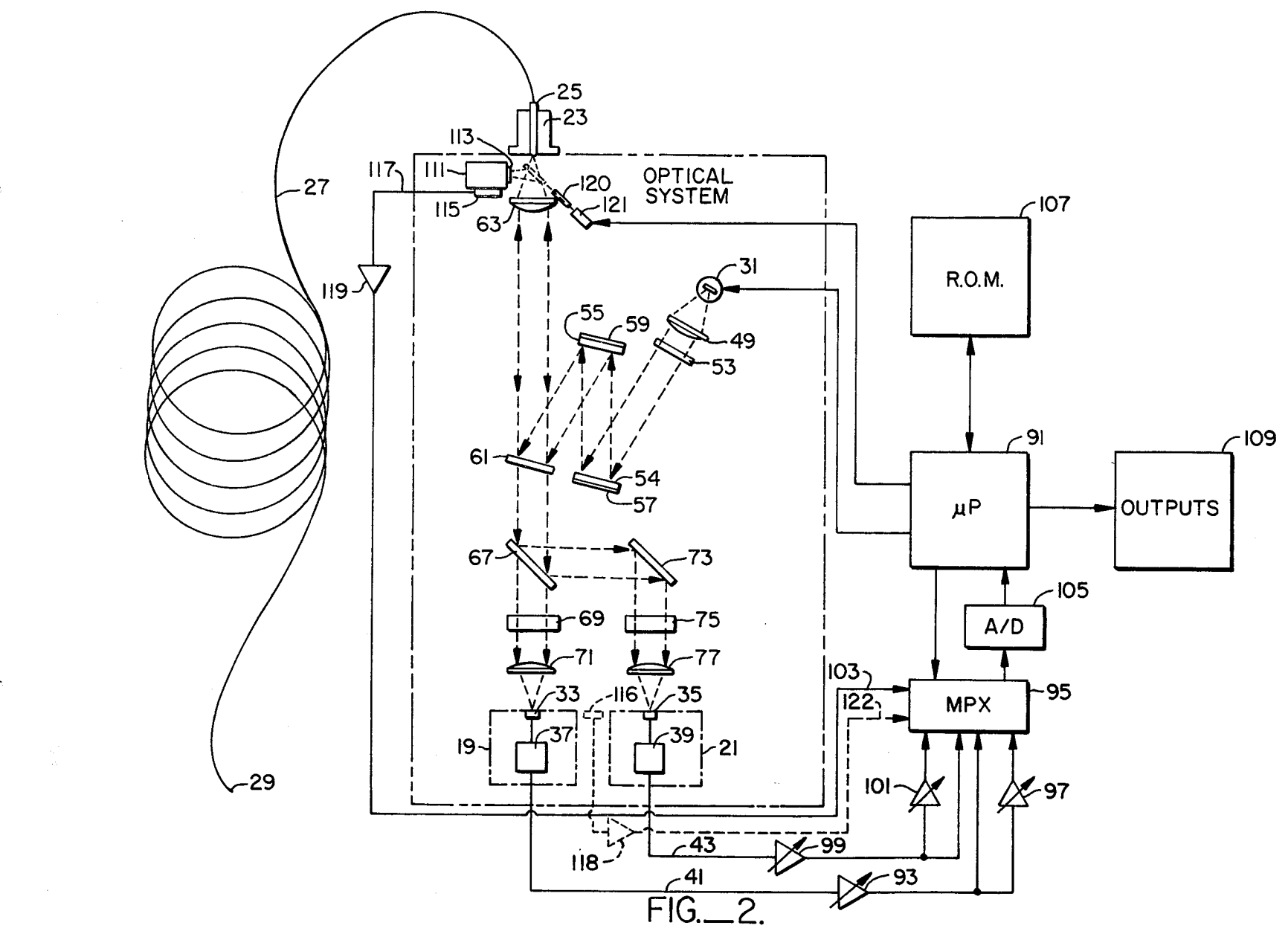

FIG._2.

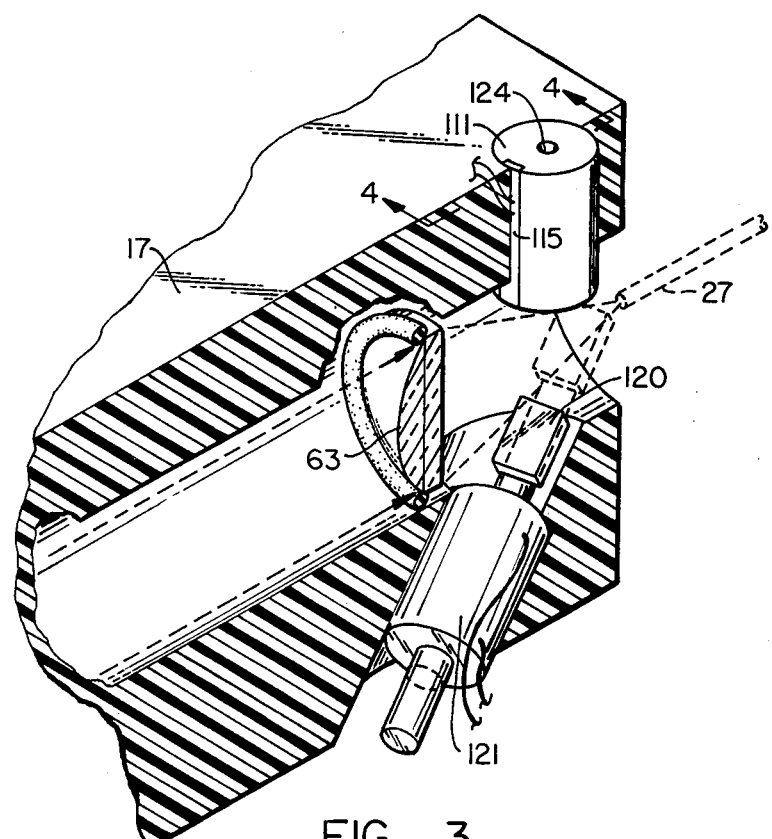
FIG._3.
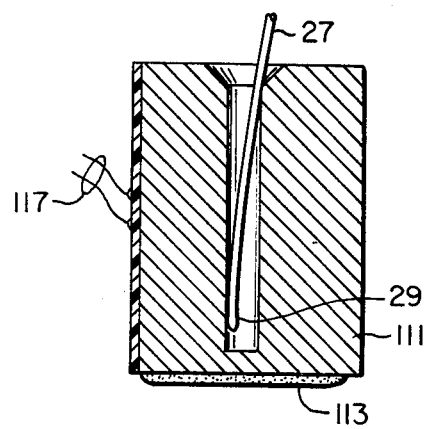
FIG._4.
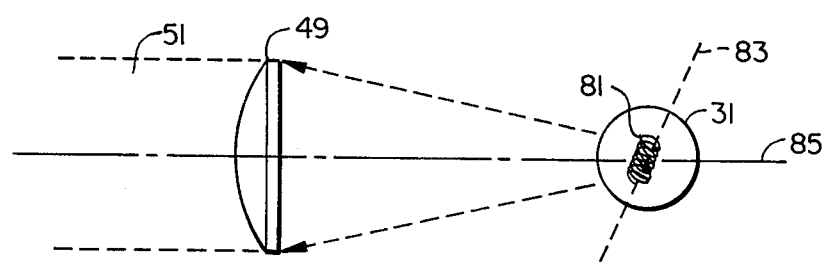
FIG._5.

OPTICAL SYSTEM FOR AN INSTRUMENT TO DETECT THE TEMPERATURE OF AN OPTICAL FIBER PHOSPHOR PROBE

BACKGROUND OF THE INVENTION

This invention relates generally to the art of optical temperature measuring, and more specifically, to electro-optic instruments for detecting and displaying temperature of an optical temperature detector.

Many particular techniques have been suggested for optically measuring the temperature of an object or an environment. A material that exhibits a change in some optical property is either applied directly to the object or made as part of a temperature probe such as a probe formed on the end of an optical fiber. One such material is a phosphor that exhibits some change in its light emission as a function of its temperature in response to appropriate radiation excitation. Measuring the decay time of a phosphor emission that after a pulse of exciting radiation, and the measurement of phosphor emission color shift as a function of temperature are two such methods that are described in U.S. Pat. No. 4,223,226—Quick et al. (1980).

Other techniques utilize varying phosphor emission intensity as a function of temperature. One form of this latter technique is described in U.S. Pat. Nos. 4,075,493—Wickersheim (1978) and 4,215,275—Wickersheim (1980), as well as co-pending patent application Ser. No. 167,691 of Wickersheim, filed July 10, 1980. These patents and application show as a preferred technique the use of a phosphor which, when excited to luminescence, emits detectable radiation within two or more distinct wavelength ranges that are optically isolatable from one another, the relative intensity of emission in these wavelength ranges varying in a known manner as a function of the temperature of the phosphor. The preferred phosphor is one that emits sharp lines of radiation upon excitation, such as those having rare earth activators. A temperature measuring system utilizing such a phosphor preferably takes the ratio of emissions within two optically separatable emission bands, and it is the ratio that is a function of the temperature of the phosphor. Ratioing eliminates many sources of error in the measurement, such as changes in the excitation source intensity or phosphor characteristics over time, or changes in the optical transmission system, such as an optical fiber, that communicates the phosphor emission to a detecting instrument.

It is a primary object of the present invention to provide an electro-optical instrument for use with a phosphor detector, particularly when the detector is provided at the end of a length of optical fiber, that converts the phosphor radiation emission to an accurate indication of the temperature of the phosphor.

SUMMARY OF THE INVENTION

This and additional objects are accomplished by the various aspects of the present invention, wherein, briefly, one or more temperature sensitive optical detectors are separated within the electro-optical instrument from a phosphor exciting light source, that generates undesirable heat, by an optical system that is preferably contained in a plastic or other non-heat conductive material, a heat sink provided adjacent to the light source for dissipating heat of the source into the environment surround the instrument. An optical system within the plastic enclosure, according to a particular application of the invention, selects a radiation band, which may be ultra-violet, from the light source emission and directs this band into an optical fiber which has a phosphor temperature detecting probe at its free end. Visible radiation emitted by the phosphor and communicated by the optical fiber or other optical system to the instrument is directed by its internal optics onto one or more detectors. Wavelength selective dichroic mirrors are used as part of the instrument's optical system to isolate the source and detectors. The preferred source is a specialized incandescent lightbulb having a filament generally in the shape of a helix, the lightbulb being tilted with respect to the optical system just until all the spaces between the filiment loops are eliminated, thereby to obtain the maximum amount of imaged energy onto the end of the optical fiber without a more complicated optical system.

Additional features, objects and advantages of the various aspects of the present invention will become apparent from the following detailed description of a preferred embodiment thereof, which description should be taken in conjunction with the accompanying drawings.

BRIEF DESCRIPTION OF THE DRAWINGS

FIG. 1 is a top view of a portion of an instrument utilizing the various aspects of the present invention, with certain portions cut away to show the optical system therein;

FIG. 2 is a schematic representation of the optical system of FIG. 1, and in addition shows schematically the electronic system that operates with the optics;

FIG. 3 shows in an enlarged sectional view a portion of the optical system as shown in FIG. 1 taken at section 3—3 thereof;

FIG. 4 is a sectional view of a component of FIG. 3, taken at Section 4—4 thereof, that is utilized in a temperature reference system; and FIG. 5 shows the orientation of the light source of the system of FIG. 1, viewed at Section 5—5 thereof.

DESCRIPTION OF A PREFERRED EMBODIMENT

Referring initially to FIG. 1, certain portions of a complete optical instrument that utilize the various aspects of the present invention are shown. An instrument housing 11 includes upright sides, such as a back wall 13. Inside the overall instrument housing is a light source housing block 15, an optical housing block 17, detector assemblies 19 and 21, and an optical fiber connector receptacle 23. A standard type of available optical fiber connector 25 is attached to a length 27 of a single optical fiber, although a bundle of optical fibers could be used as well. At a free end 29 of the optical fiber 27 is an optical temperature sensor. The sensor includes a small amount of phosphor material attached to the end of an optical fiber and encapsulated, the details of which are disclosed in the aforementioned Wickersheim patents and pending application. For the specific example of an instrument being described herein, the phosphor utilized is europium doped gadolinium oxysulfide. This rare earth phosphor is excited by passing ultra-violet radiation from the instrument down the optical fiber 27. Visible radiation emitted from the phosphor is then passed back along the optical fiber 27 to the instrument. Two sharp emission lines are, in this specific example, utilized by the instrument to determine the temperature of the phosphor sensor 29. These lines are a red line at 6260 angstroms and a green line at 5380 angstroms. The emission intensity in these lines vary independently of each other as a function of phosphor temperature. The ratio of these intensities varies in a known way as a function of temperature.

The connector 25 when captured by the receptacle 23 that is accessible from there are of the instrument, places the optical fiber 27 in optical communication with the instrument. A light source 31 provides the phosphor exciting ultra-violet radiation. Ultra-violet radiation is preferred for most applications but other radiation bands could be selected. For example, blue exciting radiation is appropriate for very long optical fibers. The optics within the housing 17 selects the red emission line and applies it to a photo detector 33. Similarly, the optics selects the green emission line and applies it to a photodector 35. An electrical signal from each of these detectors that is proportional to the intensity of the light striking them within their respective restricted wavelength ranges, are amplified by individual pre-amplifiers 37 and 39 whose amplified outputs appear in circuits 41 and 43, respectively. Each of the preamplifier and detector units are preferably formed as a unitary structure that is shielded from interference by stray fields.

The light source 31 is preferably a tungsten halogen incandescent lightbulb. Such a bulb emits a small proportion of its output within the ultra-violet range, but is preferred because of its easy availability, small size and low cost. A disadvantage is the amount of heat generated by the lamp in order to obtain the excitation radiation. Accordingly, the bulb 31 is carried within a chamber 45 of a solid piece of heat conductive material such as aluminum or some other metal. The bulb 31 is preferably carried by a structure that is pre-aligned so that when replaced, the filament of the bulb is automatically aligned with the optical system. In order to carry the heat away from the optical system, the light source housing block 15 is positioned at the rear of the instrument and connected directly with heat cooling fins 47. Heat from the bulb 31 is then carried through the light source block housing to be dissipated through the fins 47 into the atmosphere surrounding the instrument. The temperature sensitive photo detectors 33 and 35 are purposely positioned at an opposite end of the optical housing block 17 from the source so that they will be minimally heated by it. The optical block 17 is made of a non-heat conductive material such as plastic and may be molded or machined from a solid block.

The optics for the source radiation will now be described. A quartz lens 49 takes the light emitted from the small filament of the bulb 31 and collimates it into a beam 51 that is initially passed through a filter 53 that is designed to block all but the excitation frequencies, in this specific example being within the ultra-violet range. In order to further eliminate radiation outside the ultraviolet range, particularly to eliminate radiation to which the detectors are sensitive, the beam is reflected off two dichroic mirrors 54 and 55 held in tandem. These mirrors are selected to be highly reflective to ultraviolet radiation while allowing visible and infrared radiation to pass through them. Visible and infrared radiation absorbing coatings 57 and 59 are applied to the back of these mirrors, respectively. The ultra-violet light is then reflected from another dichroic mirror 61 to a quartz lens 63 that focuses the collimated beam onto the end of the optical fiber 27 that is positioned within the receptacle 23.

The optical system for the visible radiation that enters from the optical fiber 27 will be explained. The mirror 61 and lens 63 are common both to the visible radiation light path and the ultra-violet source radiation path. The lens 63 takes the light at the end of the optical fiber 27 and collimates it, directing the collimated beam against the mirror 61. The dichroic mirror 61 is chosen to have a crossover wavelength such that it is highly reflective to the ultra-violet source radiation but highly transmittive to the visible radiation, thereby resulting in the visible radiation passing through it as a beam 65. The dichroic mirror 61 thus also acts as a filter, reflecting any ultra-violet radiation back to the source and keeping it from reaching the detector region.

The radiation beam 65 contains the full spectrum of visible radiation from the phosphor temperature sensor luminescence. Since only narrow wavelength ranges are of interest, additional optical elements are provided to separate the wavelengths of interest from the broad visible spectrum in the beam 65. A dichroic mirror 67 is selected in this particular example to transmit through a filter 69 and a lens 71 the red emission line of interest to the detector 33. The dichroic mirror 67 is selected to reflect the green emission line of interest onto a regular mirror 73 and thence through a filter 75 and then focused by lens 77 on the small area detector 35. The filters 69 and 75, respectively, are designed to pass a narrow bandwidth of the red and green emission lines of interest. The dichroic mirror 67 has a crossover wavelength mid-way between the wavelength of these two emission lines so that the red one is transmitted through the mirror 67 and the green one is reflected from it. Approximately 80% to 90% of the intensity in each of these selected lines within the beam 65 is thus applied to the respective detectors, wherein the use of an ordinary beam splitter would necessarily operate at less than 50% intensity, averaged for the transmitted and reflected lines.

The optical housing 17 is made to be light tight either in a single, solid piece, or preferably with the optical paths cut away from a block of plastic that then has a light tight but removable cover placed over its top. The entire system from the phosphor in the sensor 29 at the end of the optical fiber 27, to the detectors 33 and 35 is encased in a manner to be light tight.

A preferred manner of directing light from the lamp 31 into the optical system is illustrated in FIG. 5, looking from the side of the source and its initial optics in FIG. 1. The preferred lightbulb 31 includes a filament 81 that is helically shaped about an axis 83 and larger than the diameter of useful optical fibers. The filament necessarily is wound with spaces between each such winding. It has been found that if its axis 83 is tilted a correct amount with respect to an axis 85 of the optical system which images the filament 81, that a maximum proportion of the light emission of the lamp 31 is made useful to the system without having to use any complicated reflectors or further optical systems. The axis 83 is tilted upwards with respect to the axis 85 until the spaces between the windings of the filament 81 are minimized or eliminated. At that point, the incandescent surface appears nearly or completely continuous when viewed along the axis 85 through the optics including the lens 49. The optimum angle has been found for one commercially available lamp to be about 45 degrees. If the filament axis 83 is made to be perpendicular with the optical axis 85, as can be seen, the filament with all the spaces between them are imaged through the optical system onto the end of the optical fiber and no energy is present at the imaged spaces. Magnification does not help because a fundamental theorem of optics teaches that the brightness which fills the acceptance angle of the optical fiber cannot be increased by optical means such as magnification. Only by removing the spaces in the incandescent image, can the energy into the optical fiber be increased. One method is to tilt the axis of the incandescent helix, another is to place a spherical mirror on the opposite side of the filament from the lens which produces an inverted real image superimposed on the helix, thereby filling in most of the spaces. The former method produces nearly equivalent results more simply than the latter.

Referring to FIG. 2, an electronic system is illustrated in general terms that cooperates with the optical system described to process the information from it and to control its operation. A ratio is taken of the analog signal levels in the circuits 41 and 43, and it is that ratio that is related to the temperature of the phosphor in the sensor 29 in a known way. There are many standard ways of implementing an electronic system for taking the ratio and converting to an equivalent temperature. A simple analog system could be utilized or it could even be done by hand if the voltage levels in the circuits 41 and 43 were independently measured. But with the current sophistication in digital electronics and the wide availability of circuit chips makes a digital implementation preferred. Further, the use of a microprocessor MP 91 as a central controlling element of the system is desirable.

The signal voltage in the circuit 41 is amplified by amplifier 93 which has a variable gain. The output of that amplifier is applied directly to a digital multiplexer 95 as one of five inputs. That output is also applied through a second variable gain amplifier 97, whose output then becomes another of the inputs to the multiplexer 95. Similarly, the other circuit 43 is applied to an input of a variable gain amplifier 99 whose output is applied directly as another input to the multiplexer 95 and also through a second variable gain amplifier 101 to the multiplexer 95 as a fourth input. A fifth input 103 is from a reference target temperature sensor that is described hereinafter. The multiplexer 95 selects one of the five inputs at a time under the control of the microprocessor 91. The selected input is then converted from its analog form to a digital form by a converter 105. The output, in digital form, of the analog-to-digital converter 105 is utilized by the microprocessor 91 as the input data from which the temperature of the sensor 29 is determined and the instrument is calibrated. The microprocessor 91 operates under the control of a read only memory 107. Output circuits 109 receive the processed information from the microprocessor 91 and includes the output in the form desired for any particular application. Most commonly, there would be a display so that the user of the instrument can read the temperature of the sensor. The temperature information in digital form could also, or alternatively, be applied to other digital processing equipment. The output circuits 109 could also, or alternatively, include a digital to analog converter for driving a chart recorder.

With reference primarily to FIGS. 2, 3 and 4, a system is now described for calibrating the instrument and, once calibrated, for maintaining that calibration automatically. As described in the aforementioned two patents and one pending patent application of Wickersheim, the ratio temperature sensing technique eliminates as a concern most causes of error that occur over time due to changes in the optical or electronic system. But any system needs to be initially adjusted so that it is operating within the proper operating range of its electronic and optical components. Furthermore, even though the ratioing technique does automatically compensate for many drift type errors ove time, it has been found that photo-diodes generally preferred for use as the detectors 33 and 35 have temperature dependent characteristics that can cause variations to occur as their temperature varies. What is particularly surprising is that even when the temperature of the detector 33 and 35 is maintained the same, any variation in that common temperature can cause variations to occur because each of the detectors is receiving a different wavelength of light. Their temperature dependent characteristics for the selected red line phosphor emission is not exactly the same, for example, as that for the selected green line emission. Therefore, as an alternative to a complicated system for maintaining the detectors 33 and 35 at the same constant temperature, an electro-optical system is provided to permit periodic manual calibrations and/or to permit automatic electronic compensation for any drift errors.

From FIG. 2, it will be noticed that at the dichroic mirror 67, the two optical wavelength signal paths separate from a common path that has originated in the temperature sensor 29. From the sensor 29 to the element 67, optical changes with time will not affect the temperature reading because of the ratioing technique. Even changes in the source intensity which necessarily occurs after operating the lamp 31, will have little if any effect on the ultimate temperature reading. But, once the two optical signals have been separated from one another, any changes in one signal path which are not duplicated in the other signal path can cause errors in the temperature readings.

Accordingly, the reference system shown in FIGS. 2, 3 and 4 is provided. A target element 111 is imbedded in a surface of the plastic optical housing 17 adjacent the fiber optic coupling 23. The target 111 is perferably made of a high heat conductive material, such as aluminum or some other metal, and is given sufficient mass so that it has a high thermal inertia. The target 111 is positioned directly over the path of the ultraviolet and visible light combined beam that is focused by the lens element 63 onto an end of the optical fiber 27. On its underside is a reference layer 113 of phosphor material of the same composition as that used in the temperature sensor 29. On the side of the target 111 is a semi-conductor device 115 installed in a groove provided in the metal. The semi-conductor device 115 is designed so that a signal in a circuit 117 is proportional to the temperature of the semi-conductor material, and thus also the temperature of the rest of the target 111, particularly its underside to which the reference phosphor layer 113 is attached. The temperature signal in the line 117 is passed through a fixed gain amplifier 119, whose output is the circuit 103 that is the fifth input to the multiplexer 95. The microprocessor 91 in thus provided with a non-optical temperature transducer which it may interrogate for comparison with the temperature reading obtained by directing the optical system onto the reference temperature phosphor 113.

The optical system is disconnected from looking at the phosphor emissions from the sensor 29 and connected to look at those emissions from the reference phosphor 113 by use of a mirror 120 that is controlled in its position by a solenoid 121. In the particular system shown, the mirror 120 is constrained to slide back and forth at an angle of approximately 45 degrees with respect to the optical axis of the lens 63. As shown in FIGS. 2 and 3, when the mirror is retracted, the detectors 33 and 35 will be viewing emissions from the sensor 29. But when the mirror 119 is extended, the detectors 33 and 35 look at the emissions of the reference phosphor 113. Similarly, the ultra-violet excitation light from the source 31 is transferred from the sensor 29 to the reference phosphor 113 when the mirror is extended, since both the ultra-violet and visible light paths are co-axial.

The ability to check the optical temperature measurement with that of the semi-conductor device or element 115 allows the operator of the instrument to adjust the gains of the amplifiers 93, 97, 99 and 101 in an appropriate manner to calibrate the instrument. In addition, the electronics preferably periodically checks the calibration by energizing the solenoid 121 and moving the mirror 119 into position so that the reference phosphor 113 is thus made part of the system. This can be done for a second every few minutes while the instrument is being used so that the operator may not know that it is occurring. At the same time the solenoid 121 is energized, the temperature obtained from the reference phosphor 113 is compared to that of the semiconductor 115 and any necessary compensating factors set for use when the sensor 29 is next used. The difference between the two readings is remembered in the microprocessor memory and that difference is used to correct subsequent temperature readings. The correction amount remembered is updated during each subsequent temperature check.

Alternatively, a less direct method of compensating for only the changing detector characteristics as a result of temperature changes is to place one or two temperature sensors 116 in thermal contact with both or each, respectively, of the detectors 33 and 35. This is shown in dotted outline in FIG. 2 as a possible replacement for the internal compensation system described above that utilizes the phosphor coated temperature element 111 with semiconductor device 115. Such a system uses an amplifier 118 with the detector 116 whose output 122 becomes an input to the multiplexer 95 in place of input 103. The microprocessor 91 then uses the temperature of the detector 116 to look up a correction factor stored in the memory 107 to compensate for variations in sensitivity of the detectors 33 and 35 with variations in their temperature.

Even though the ratioing technique eliminates errors due to gradual drifting of the source intensity, transmission of common optical elements before the mirror 61, or other changes, it is desirable calibrate the instrument within optimum operating windows and particularly when a new probe is connected. Therefore, the reference temperature element 111 is adapted for receiving through a small aperture 124 the sensor 29 at the end of the optical fiber 27. The phosphor sensor is thus positioned within a small air cavity that is completely surrounding by a mass of metal at a uniform temperature. The phosphor within the sensor 29 is thus raised to that same temperature which can be compared by the electronics to the temperature known to be accurate as obtained from the semiconductor element 115. The operator can then adjust the gain of the appropriate amplifiers 93, 97, 99 and 101 so that the instrument is operating at the proper amplification levels given the conditions of the common optical signal path at the moment. Most changes which occur after that time in a common optical path will not create any applicable errors since the ratioing technique is insensitive to such gradual common path changes.

Although the various aspects of the present invention have been described with respect to a particular optical temperature sensing technique and specific instrument implementation, it will be understood that the invention is entitled to protection within the full scope of the appended claims. Many variations and generalizations of the specific techniques described with respect to the drawings are possible. For example, the referencing and calibration techniques described are useful even where ratioing is not employed and, in fact, are essential in those applications since no part of certain degradation over time is automatically corrected. Also, the referencing and calibration devices and techniques are useful in instruments that employ other than phosphor intensity measurement, such as in line wavelength shift or decay time techniques. Various other types of phosphors may be substituted for that described in this example, and other temperature sensing materials that change some detectable optical characteristics can also benefit from the techniques of this invention.

It is claimed:

1. In an elctro-optical instrument for measuring temperature detected by phosphor attached to one end of a length of optical fiber wherein said phosphor is characterized by emitting, when excited, optical radiation at at least two distinct wavelength ranges and with relative intensities therein that vary as a known function of the phosphor temperature, an optical system comprising:
   an instrument housing,
   a light source mounted in a heat conductive block that is physically positioned adjacent one side of said housing with means attached to said block for transferring heat therefrom to the air surrounding the instrument through said housing side,
   a heat-insulating optical housing that includes means for attachment of another end of said optical fiber and is positioned adjacent said heat conductive block in a manner to receive light from the source within said block,
   a pair of visible light detectors attached to said optical housing on a side thereof opposite to that of said source block, thereby to be isolated from the heat of the light source, and
   an optical system contained within said optical housing, comprising:
      means for imaging said another end of the optical fiber onto each detector,
      means cooperating with said detector imaging means for limiting the visible radiation striking each detector to one of said at least two distinct wavelength ranges emitted by said phosphor, and
      means for imaging a wavelength range of said light source onto said another end of the optical fiber, whereby said radiation causes said phosphor to emit visible radiation within said at least two distinct wavelength ranges that is detected by said pair of visible light detectors.

2. The optical system of claim 1 wherein said housing includes a block of solid material in which said detector imaging means, said visible radiation limiting means and said source imaging means are positioned within said block in enclosed light tight channels through which light beams pass therebetween.

3. The optical system of claim 1 wherein said, light source is characterized by having an incandescent filament formed by several turns in substantially the shape of a helix that is tilted with respect to said source imaging means and supported in a manner that a side of the filament is imaged onto said another end of the optical fiber substantially without spaces between the filament turns, whereby a higher porportion of the available light output of the source is utilized to excite the phosphor.

4. The optical system according to claim 1, wherein said detector imaging means of the optical system contained within the optical housing includes a dichroic mirror positioned in the path of the visible radiation received from said another end of the optical fiber in a manner that a portion of said visible radiation passes onto one of said pair of detectors by transmission through said dichroic mirror and another part is reflected from said dichroic mirror onto the second of said pair of detectors, said dichroic mirror being characterized by a high degree of transmission of all light wavelengths on one side of a crossover wavelength and a high degree of reflectance to all wavelengths on the other side of said crossover wavelengths, said crossover wavelength being chosen to be intermediate of said two distinct wavelength ranges of visible radiation emitted by said phosphor.

5. The optical system according to claim 1, wherein said detector imaging means and source imaging means utilize a common optical path adjacent said another end of said optical fiber, said common path including a dichroic mirror positioned therein and characterized by transmitting visible radiation within said at least two distinct wavelength ranges emitted by the phosphor while transmitting substantially no excitation wavelength radiation from the source, and reflecting excitation radiation from the source while reflecting substantially no visible radiation within said at least two distinct wavelength ranges from the phosphor, whereby the phosphor exciting radiation is separated from the visible radiation emitted by said phosphor that is desired to be applied to said pair of detectors.

6. The optical system of claim 1 wherein said excitation wavelength range imaging means includes at least one dichroic mirror characterized by reflecting substantially all excitation radiation and transmitting substantially the remaining visible radiation incident on a front side, a visible light absorbing material being positioned on a backside of said mirror.

7. The optical system of claim 1 wherein said instrument housing includes a high thermal inertia piece of solid material having a well therein shaped and positioned to receive said one optical fiber end, said material piece having a non-optical, electrical temperature sensor attached thereto, whereby a capability is provided for calibrating the phosphor emissions.

8. The optical system of claim 7 wherein said piece of solid material additionally includes a layer of phosphor attached thereto, and wherein said optical system additionally comprises means in said optical housing adjacent said optical fiber another end attachment means for controllably substituting said phosphor layer for said optical fiber another end as an object imaged by said optical system onto said detectors, thereby providing a known temperature reference optical signal for calibration of the system.

9. An electro-optical instrument for detecting and indicating the temperature of phosphor material that is physically removed from but in optical communication with the instrument, comprising:
  a solid block of opaque material having a plurality of connected tunnels of void space formed therein,
  a source of optical radiation of a type that causes said phosphor to emit visible radiation,
  first optical means held within one of said tunnels of said block for directing said source radiation thereinto,
  second optical means held within another of said tunnels of said block for directing the radiation emitted from said phosphor thereinto,
  a detector of said phosphor emitted radiation, and
  third-optical means held within yet another of said tunnels of said block for directing radiation therefrom onto said detector,
  said first, second and third optical means and the path of the tunnels being arranged so that said optical means are all interconnected by optical radiation passing therebetween in order that said phosphor is illuminated by said source and the visible radiation emitted by the phosphor is imaged onto said detector with substantially no stray radiation striking said detector.

10. The instrument according to claim 9 wherein said solid block is characterized by a high degree of thermal non-conductivity, and said radiation source being displaced a distance from said detector, whereby the effect of any heat generated by said source on characteristics of said detector is minimized.

* * * * *